United States Patent
Park et al.

(10) Patent No.: US 8,900,762 B2
(45) Date of Patent: Dec. 2, 2014

(54) FUEL CELL WITH RECOVERING UNIT AND METHOD FOR DRIVING THE SAME

(75) Inventors: Jung Kurn Park, Yongin-si (KR); Dong Hyun Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1277 days.

(21) Appl. No.: 11/712,117

(22) Filed: Feb. 28, 2007

(65) Prior Publication Data

US 2007/0207352 A1  Sep. 6, 2007

(30) Foreign Application Priority Data

Mar. 3, 2006  (KR) .................. 10-2006-0020532

(51) Int. Cl.
*H01M 8/06* (2006.01)
*H01M 8/04* (2006.01)
*H01M 8/10* (2006.01)

(52) U.S. Cl.
CPC ...... *H01M 8/04097* (2013.01); *H01M 8/04141* (2013.01); *H01M 8/04164* (2013.01); *H01M 8/04201* (2013.01); *H01M 8/04291* (2013.01); *H01M 8/1011* (2013.01); *Y02E 60/50* (2013.01)
USPC ........... 429/415; 429/414; 429/444; 429/513; 429/515

(58) Field of Classification Search
CPC ............... H01M 8/04082; H01M 8/04089; H01M 8/04097; H01M 8/04186; H01M 8/04201; H01M 8/04291
USPC ......... 429/413–415, 443, 444, 447, 512, 513, 429/515
See application file for complete search history.

(56) References Cited

U.S. PATENT DOCUMENTS 6,506,513 B1  1/2003  Yonetsu et al.
6,660,423 B2  12/2003  Neutzler et al.
(Continued)

FOREIGN PATENT DOCUMENTS

JP  2003-331899 A  11/2003
JP  2004-152561   5/2004
(Continued)

OTHER PUBLICATIONS

European Search Report for European application No. 07103438.3-1227 dated Jun. 2, 2008 by European Patent Office.
(Continued)

*Primary Examiner* — Edu E Enin-Okut
(74) *Attorney, Agent, or Firm* — Knobbe Martens Olson & Bear LLP

(57) ABSTRACT

A fuel cell with a recovering unit and a method of driving the same are disclosed. In one embodiment, the fuel cell includes i) an electric generator to generate electricity based on electrochemical reaction, ii) a recovering unit to recover and mix the fuel, unreacted fuel, and gas and water produced by the electrochemical reaction, and supply the mixed fuel to the electric generator, wherein the recovering unit comprises a valve, configured to discharge gas, which is selectively opened and closed depending on the operation of the fuel cell. With this configuration, the gas or the fuel is not introduced into the electric generator, even though the recovering unit is inclined or turned over. Further, even though the fuel cell is not in use for a long time, the mixed fuel is prevented from evaporating through the discharging pipe.

10 Claims, 2 Drawing Sheets

(56) References Cited

U.S. PATENT DOCUMENTS

| | | |
|---|---|---|
| 6,686,081 B2 * | 2/2004 | Gottesfeld .................... 429/430 |
| 7,432,003 B2 | 10/2008 | Miyazaki et al. |
| 7,544,434 B2 | 6/2009 | Yamauchi et al. |
| 2002/0146616 A1 | 10/2002 | Yasuo et al. |
| 2004/0013928 A1 | 1/2004 | Yamauchi et al. |
| 2004/0062960 A1 * | 4/2004 | Sakaue et al. .................... 429/19 |
| 2004/0115506 A1 * | 6/2004 | Miyazaki et al. ............... 429/34 |
| 2005/0130010 A1 | 6/2005 | Choi |
| 2005/0164055 A1 * | 7/2005 | Hasegawa et al. .............. 429/22 |
| 2006/0040146 A1 * | 2/2006 | Yamaguchi ..................... 429/12 |

FOREIGN PATENT DOCUMENTS

| | | |
|---|---|---|
| JP | 2004-186151 A | 7/2004 |
| JP | 2005-100886 | 4/2005 |
| JP | 2005-203355 A | 7/2005 |
| JP | 2006-059623 A | 3/2006 |
| KR | 10-2004-0028543 A | 4/2004 |
| WO | WO 96/12317 | 4/1996 |

OTHER PUBLICATIONS

Chinese Office Action dated Jan. 11, 2012 for Chinese Patent Application No. CN 200710080045.4 which shares priority of Korean Patent Application No. KR 10-2006-0020532 with captioned U.S. Appl. No. 11/712,117.

Chinese Office Action dated May 25, 2011 for Chinese Patent Application No. CN 200710080045.4 which shares priority of Korean Patent Application No. KR 10-2006-0020532 with captioned U.S. Appl. No. 11/712,117.

* cited by examiner

FUEL CELL WITH RECOVERING UNIT AND METHOD FOR DRIVING THE SAME

CROSS-REFERENCE TO RELATED APPLICATIONS

This application claims the benefit of Korean Patent Application No. 2006-0020532, filed on Mar. 3, 2006, in the Korean Intellectual Property Office, the disclosure of which is incorporated herein by reference.

BACKGROUND

1. Field of the Invention

The present invention relates to a fuel cell with a recovering unit and a method of driving the same, in which the recovering unit recovers gas, water and unreacted fuel produced in an electric generator of a fuel cell system and discharges the gas and recycles water and the unreacted fuel effectively.

2. Discussion of the Related Technology

In general, a fuel cell is a power generating system that directly transforms chemical energy into electric energy by an electrochemical reaction between hydrogen and oxygen. In supplying hydrogen to a fuel cell system, pure hydrogen or hydrogen gained from methanol, ethanol, natural gas or the like can be directly used. Further, in supplying oxygen to the fuel cell system, pure oxygen can be directly used, or oxygen contained in air can be supplied by an air pump or the like.

SUMMARY OF CERTAIN INVENTIVE ASPECTS

One aspect of the present invention provides a fuel cell with a recovering unit and a method of driving the same, in which gas recovered from an electric generator of the fuel cell into a recovering container is prevented from flowing into an anode electrode or mixed fuel is prevented from flowing into a cathode electrode, additionally the mixed fuel stored in the recovering container is prevented from evaporating.

Embodiments of the present invention are achieved by providing a fuel cell comprising: i) an electric generator to generate electricity based on oxidation of mixed fuel in an anode electrode and reduction of oxygen in a cathode electrode, ii) a fuel container to store raw fuel, iii) a recovering unit to recover and mix the raw fuel, unreacted fuel not participated in the oxidation of the electric generator, and water produced by the reduction to make the mixed fuel, and supply the mixed fuel to the electric generator and iv) an air feeder to supply oxygen to the electric generator, wherein the recovering unit comprises a housing connected to and communicating with the electric generator and the fuel container, a discharging pipe provided inside the housing to discharge gas recovered from the electric generator, and having a first end extending to the outside of the housing and a second end extending to the inside of the housing and a first valve provided in the discharging pipe.

The recovering unit may further comprise a second valve provided in an anode recovering pipe which connects the housing with an outlet of the anode electrode of the electric generator to communicate with each other. Further, the recovering unit may comprise a third valve provided in a cathode recovering pipe which connects the housing with an outlet of the cathode electrode of the electric generator to communicate with each other. Also, the second valve and the third valve may comprise on/off valves or check valves.

In one embodiment, the second end of the discharging pipe connected to a float. Further, the housing may comprise a porous material placed on an inner surface thereof and adjacent to the anode recovering pipe.

Another aspect of the present invention provides a method of driving a fuel cell, comprising: i) supplying hydrogen containing mixed fuel and oxygen to an electric generator via a first supplying line and a second supplying line, ii) generating electricity by electrochemical reaction between hydrogen and oxygen in the electric generator, iii) recovering byproducts produced by the electrochemical reaction of the electric generator to a recovering unit via a recovering path, iv) discharging gas contained in the byproducts from the recovering unit to the air and v) mixing unreacted fuel contained in the byproducts, water and fuel into the hydrogen containing mixed fuel while discharging the gas to the air.

BRIEF DESCRIPTION OF THE DRAWINGS

These and/or other aspects of the invention will become apparent and more readily appreciated from the following description of embodiments, taken in conjunction with the accompanying drawings.

DETAILED DESCRIPTION OF CERTAIN INVENTIVE EMBODIMENTS

Figure 1:
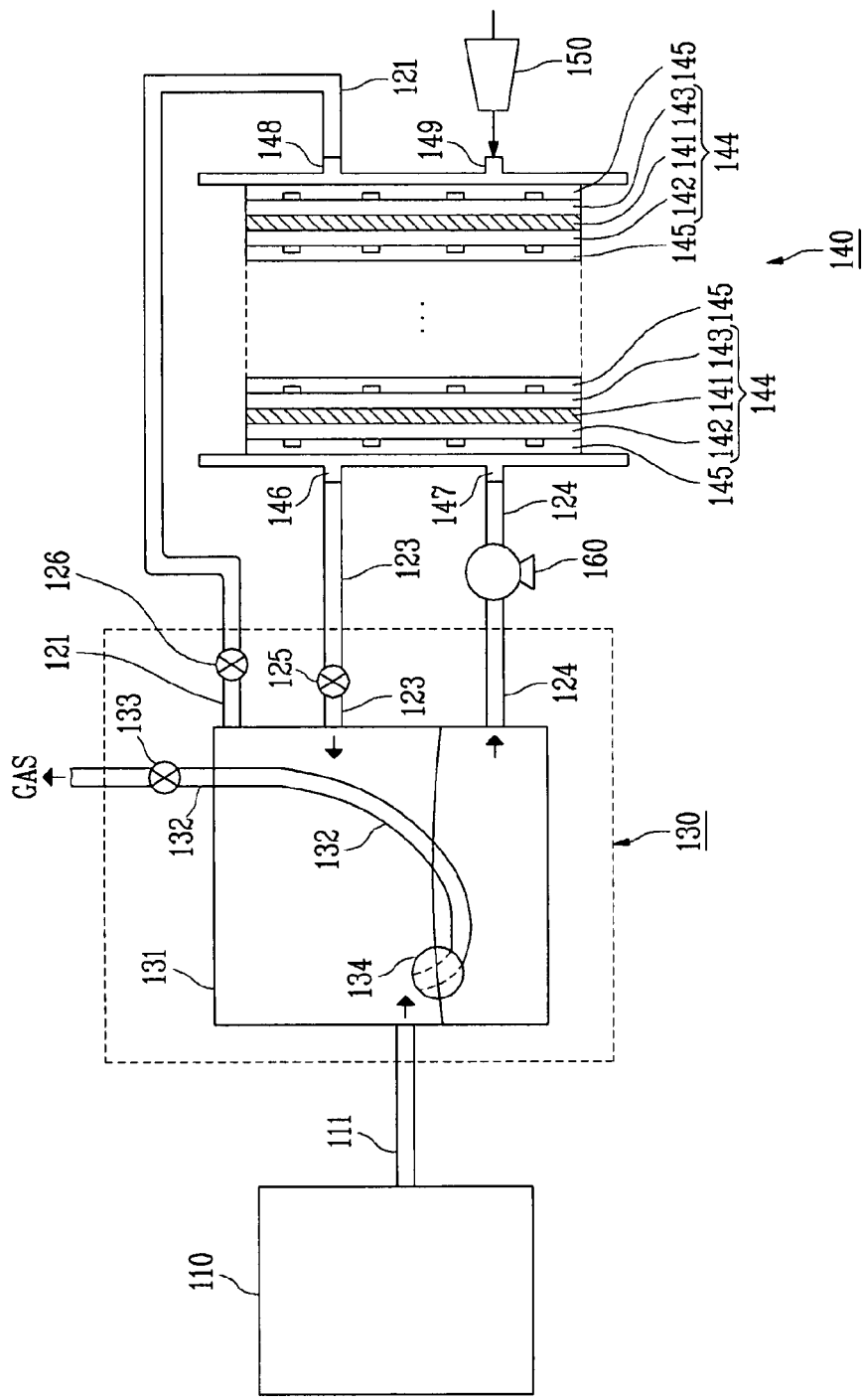
FIG. 1 is a schematic view of a fuel cell system with a recovering unit according to an embodiment of the present invention.

A fuel cell is generally classified into i) a polymer electrolyte membrane fuel cell (PEMFC) and ii) a direct methanol fuel cell (DMFC), which operate at room temperature or a temperature of less than about 100° C., iii) a phosphoric acid fuel cell (PAFC) which operates at a temperature of about 150° C.~about 200° C., iv) a molten carbon fuel cell (MCFC) which operates at a temperature of about 600° C.~about 700° C., v) a solid oxide fuel cell (SOFC) which operates at a high temperature of more than about 1000° C., and so on. These fuel cells operate on basically the same principle, but they are different in the kind of used fuel, catalyst, electrolyte, etc.

Among the fuel cells, in the DMFC operating at a relatively low temperature, mixed fuel of methanol and water is supplied directly to an anode electrode of an electric generator, oxygen in air is supplied to a cathode electrode, and electricity is generated by electrochemical reaction between hydrogen contained in methanol and oxygen.

Meanwhile, the fuel cell can include a recovering container to recover the unreacted fuel, which has not participated in the electrochemical reaction of the anode electrode, and water, which is produced by the chemical reaction of the cathode electrode, in order to supply them to the electric generator again. The recovering container includes a discharging pipe to discharge unnecessary gas contained in the unreacted fuel.

Such a recovering container is connected to and communicate fluid with the electric generator. Therefore, when the fuel cell is maintained abnormally, for example, when the fuel cell is maintained inclined or reversed, the mixed fuel stored in the recovering container is likely to flow into the cathode electrode or the gas is likely to flow into the anode electrode.

Further, if the discharging pipe is opened for a long period of time without operating the fuel cell, the mixed fuel stored in the recovering container, due to high volatility, is continuously evaporated through the discharging pipe, thereby exhausting the fuel wastefully.

Hereinafter, embodiments of the present invention will be described with reference to accompanying drawings, wherein like numerals refer to like elements and repetitive descriptions will be avoided as necessary. Further, the shape and the size of the elements shown in the drawings may be exaggerated for convenience.

FIG. 1 is a schematic view of a fuel cell system with a recovering unit according to an embodiment of the present invention.

In one embodiment, as shown in the fuel cell system of FIG. 1, raw fuel is methanol, particularly, high concentration methanol, and mixed fuel or hydrogen containing mixed fuel is mixture of the raw fuel and water and/or unreacted fuel recovered from the electric generator.

Referring to FIG. 1, the fuel cell system includes a fuel container 110, a recovering unit (or a fuel provider) 130, an electric (or electricity) generator 140, and an air feeder (or an oxygen provider) 150.

The raw fuel stored in the fuel container 110 is supplied to the recovering unit 130 through a fuel supplying pipe 111 connected to and communicating with the recovering unit 130. In the recovering unit 130, unreacted mixed fuel discharged from the electric generator 140, water and the raw fuel are mixed, thereby making the mixed fuel having a predetermined concentration. The mixed fuel flows along a mixed fuel supplying pipe 124 by a fuel pump 160, and is introduced into an anode electrode 142 of the electric generator 140 through an anode inlet 147. The recovering unit 130 will be described later in more detail.

The electric generator 140 generates electricity by electrochemical reaction between hydrogen contained in the mixed fuel supplied from the recovering unit 130 and oxygen supplied from the air feeder 150. The electric generator 140 includes at least one unit cell to generate electric energy. The unit cell includes a membrane electrode assembly (MEA) 144 to oxidize the mixed fuel and reduce oxygen, and a separating plate 145 to supply the mixed fuel and oxygen to the membrane electrode assembly 144 and discharge products generated by the oxidation/reduction reaction in the membrane electrode assembly 144. The membrane electrode assembly 144 generally includes the anode electrode 142, the cathode electrode 143, and an electrolyte membrane 141 interposed between the anode electrode 142 and the cathode electrode 143. Further, the electric generator 140 has a stack structure in which a plurality of unit cells are stacked.

Meanwhile, channels (not shown) formed in one or more separating plates 145 adjacent to the anode electrodes 142 are aligned in a row and communicate with one another. One ends of the aligned channels are communicated with the anode inlet 147 formed in one side of the electric generator 140, and the other ends are communicated with an anode outlet 146 formed in the other side of the electric generator 140.

Further, channels (not shown) formed in one or more separating plates 145 adjacent to the cathode electrodes 143 are aligned in a row and communicate with one another. One ends of the aligned channels are communicated with the cathode inlet 149 formed in one side of the electric generator 140, and the other ends are communicated with an cathode outlet 148 formed in the other side of the electric generator 140.

With this configuration, the mixed fuel is introduced through the anode inlet 147 of the electric generator 140 and supplied to the anode electrode 142 along the channel of the separating plate 145 adjacent to the anode electrode 142. Further, oxygen is introduced through the cathode inlet 149 of the electric generator 140 and supplied to the cathode electrode 143 through the channel of the separating plate 145 adjacent to the cathode electrode 143.

At this time, electrochemical reactions in the electric generator 140 can be represented as the following reaction formula 1.

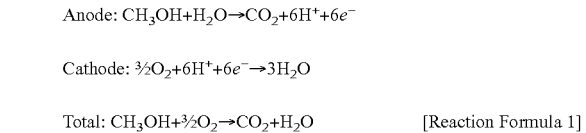

$$\text{Anode: } CH_3OH + H_2O \rightarrow CO_2 + 6H^+ + 6e^-$$

$$\text{Cathode: } \tfrac{3}{2}O_2 + 6H^+ + 6e^- \rightarrow 3H_2O$$

$$\text{Total: } CH_3OH + \tfrac{3}{2}O_2 \rightarrow CO_2 + H_2O \qquad \text{[Reaction Formula 1]}$$

As shown in the above reaction formula, gas such as carbon dioxide produced in the anode electrode 142 and the unreacted fuel, which has not participated in the electrochemical reaction of the anode electrode, flow along the channel formed in the separating plate 145 adjacent to the anode electrode 142 and are discharged through the anode outlet 146.

Further, as shown in the above reaction formula, water produced in the cathode electrode 143 flows along the channel formed in the separating plate 145, adjacent to the cathode electrode 143 and is discharged through the cathode outlet 148.

In the meantime, the fuel cell includes the recovering unit 130 to recover and recycle the unreacted mixed fuel discharged through the anode outlet 146 and water discharged through the cathode outlet 148. The recovering unit 130 has a housing 131 in which the unreacted mixed fuel, water, and the raw fuel supplied from the fuel container 110 are mixed.

At this time, the anode outlet 146 of the electric generator 140 and the housing 131 of the recovering unit 130 are connected to and communicate with each other through an anode recovering pipe 123, such that the gas such as carbon dioxide produced by the reaction in the anode electrode is introduced into the housing 131 of the recovering unit 130 through the anode recovering pipe 123 while the unreacted fuel from the anode outlet 146 is recovered into the housing 131. Further, the cathode outlet 148 of the electric generator 140 and the housing 131 of the recovering unit 130 are connected to and communicate with each other through a cathode recovering pipe 121, such that water discharged from the cathode outlet 148 is introduced into the housing 131 of the recovering unit.

The housing 131 of the recovering unit 130 includes a discharging pipe 132. The discharging pipe 132 has a first end extending to the outside of the housing 131 and provide with a first valve 133. The discharging pipe 132 has a second end extending to the inside of the housing 131 and penetrating a float 134. The second end of the discharging pipe 132 can be exposed to the gas contained in the housing 131 because of the float 134 irrespective of an inclined state of the housing 131. Therefore, the gas such as carbon dioxide or the like existing in the housing 131 of the recovering unit 130 is introduced into the second end of the discharging pipe 132 and discharged to the outside through the first end of the discharging pipe 132.

The first valve 133 is opened and closed to control an opened state of the discharging pipe 132, thereby allowing fluid to pass through the discharging pipe 132 or stopping the fluid. For example, the first valve 133 is opened while the fuel cell generates electricity, so that the gas such as carbon dioxide or the like flowing from the electric generator 140 to the housing 131 is discharged to the outside through the discharging pipe 132. On the other hand, the first valve 133 is closed when the fuel cell stops operating, so that the mixed fuel in the housing 131 is prevented from volatilizing and exhausting through the discharging pipe 132. Here, the first valve 133 can be achieved by an on/off valve or a check valve.

Further, the anode recovering pipe 123 includes a second valve 125, and the cathode recovering pipe 121 includes a third valve 126. The second and third valves 125 and 126 are opened/closed to control the opened states of the anode and cathode recovering pipes 123 and 121, respectively, thereby allowing fluid to pass through the anode and cathode recovering pipes 123 and 121 or stopping the fluid. For example, the second valve 125 and the third valve 126 are achieved by the on/off valves. The second valve 125 and the third valve 126 are opened when the fuel cell is operating, and closed when the fuel cell stops operating. Therefore, even though the fuel cell is maintained abnormal while the fuel cell is not in use, the gas such as carbon dioxide stored in the housing 131 of the recovering unit 130 is not introduced into the anode electrode of the electric generator 140 through the anode outlet 146 or the mixed fuel stored in the housing 131 is not introduced into the cathode electrode 143 of the electric generator 140 through the cathode outlet 148.

Alternatively, for example, the second valve 125 and the third valve 126 can be achieved by the check valves that allows fluid to flow in only a direction toward the inside of the housing 131 of the recovering unit 130. Thus, irrespective of whether the fuel cell is operating or stopped, it is possible to recover the unreacted fuel and the gas such as carbon dioxide into the housing 131 of the recovering unit 130 through the anode outlet 146 and the cathode outlet 148, but the gas such as carbon dioxide stored in the housing 131 of the recovering unit 130 cannot be introduced into the anode electrode 142 of the electric generator 140 through the anode outlet 146 or the mixed fuel stored in the housing 131 cannot be introduced into the cathode electrode 143 of the electric generator 140 through the cathode outlet 148.

According to another embodiment of the present invention, the mixed fuel supplying pipe 124 includes a fourth valve (not shown) to control supplying of the mixed fuel. The fourth valve can be placed in the front or back of the fuel pump 160. The fourth valve is provided for preventing the mixed fuel from being unnecessarily introduced from the recovering unit 130 into the anode inlet 147 of the electric generator 140 due to malfunction of the fuel pump 160. In one embodiment, the fourth valve is achieved by the on/off valve. The fourth valve is maintained being closed when the fuel cell is not in use. Thus, even though the fuel pump 160 malfunctions, the mixed fuel is prevented from being introduced from the recovering unit 130 to the anode inlet 147 of the electric generator 140. However, when the fuel cell is operating, the fourth valve is maintained being opened, so that the mixed fuel is introduced by the fuel pump 160 from the recovering unit 130 to the anode inlet 147 of the electric generator 140.

Figure 2:
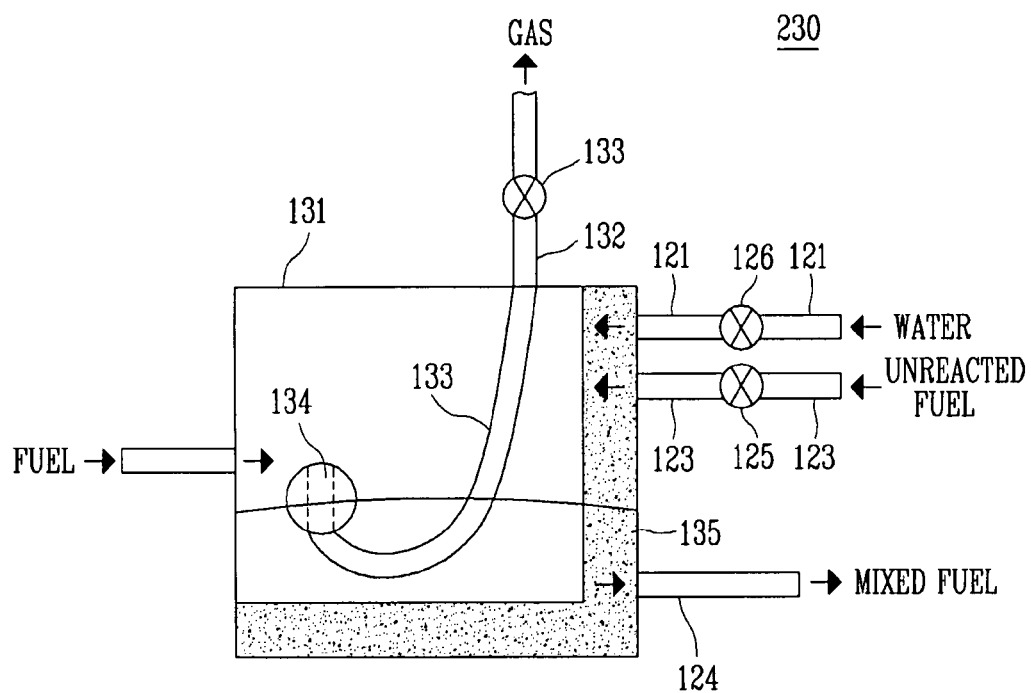
FIG. 2 is a view seeing through a housing of the recovering unit according to another embodiment of the present invention.

FIG. 2 is a view seeing through a housing of the recovering unit according to another embodiment of the present invention.

Referring to FIG. 2, a recovering unit 230 includes the same housing 131 as that of the recovering unit 130 of FIG. 1 except a porous material 135. The porous material 135 is installed on an inside surface of the housing 131. In one embodiment, the porous material 135 is installed throughout inlets of a cathode recovering pipe 121, an anode recovering pipe 123 and a mixed fuel supplying pipe 124 and the bottom of the housing 131. Because the porous material 135 retains the mixed fuel stored in the housing 131, the mixed fuel can be continuously supplied through the mixed fuel supplying pipe 124 even though the recovering unit 230 is maintained in an abnormal state, for example, it is turned over or the like. Further, because the porous material 135 is placed adjacent to the inlet of the anode recovering pipe 123, gas is prevented from being introduced into the anode recovering pipe 123.

According to an embodiment of the present invention, the gas such as carbon dioxide and the mixed fuel are prevented from being introduced into the anode electrode and the cathode electrode of the electric generator, respectively, even though the recovering unit is maintained in an abnormal state, for example, it inclined or turned over. In one embodiment, the fuel cell system includes a sensor (not shown) which can detect an inclination of the fuel cell.

Further, even though the fuel cell is not in use for a long time, the mixed fuel is prevented from evaporating through the discharging pipe provided in the housing of the recovering unit. Therefore, the fuel cell is prevented from malfunctioning, and thus more efficiently generates electricity.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A fuel cell, comprising:
    an electricity generator configured to generate electricity based on an electrochemical reaction;
    a fuel container configured to store a raw fuel;
    a recovering unit configured to mix i) the raw fuel, ii) an unreacted fuel which has not participated in the electrochemical reaction, and iii) water produced from the electrochemical reaction so as to produce mixed fuel, and supply the mixed fuel to the electricity generator; and
    an oxygen provider configured to supply oxygen to the electricity generator,
    wherein the recovering unit comprises:
        a housing connected to and communicating fluid with the electricity generator and the fuel container;
        a discharging pipe located inside the housing configured to discharge gas recovered from the electricity generator, and having a first end extending to the outside of the housing and a second end extending to the inside of the housing;
        a first valve located in the discharging pipe and configured to be opened while the fuel cell is operating such that gas inside the housing is evaporated via the discharging pipe during the operation;
        a second valve located in an anode recovering pipe which connects the housing with an outlet of an anode electrode of the electricity generator so as to communicate fluid with each other; and
        a third valve located in a cathode recovering pipe which connects the housing with an outlet of a cathode electrode of the electricity generator so as to communicate fluid with each other, wherein the cathode recovering pipe is configured to directly communicate the fluid between the cathode electrode outlet and the third valve and between the third valve and the housing,
        wherein the second and third valves are open while the fuel cell is operating, and wherein a porous material is formed on an inner surface of the housing and covers an inlet of the anode recovering pipe such that the inlet of the anode recovering pipe does not penetrate the porous material.

2. The fuel cell according to claim 1, wherein each of the second valve and the third valve comprises an on/off valve or a check valve.

3. The fuel cell according to claim 1, wherein the first valve comprises an on/off valve.

4. The fuel cell according to claim 1, wherein the second end of the discharging pipe is connected to a float.

5. The fuel cell according to claim 1, wherein the recovering unit further comprises a fourth valve placed in a mixed fuel supplying pipe which connects the housing with an inlet of the anode electrode of the electricity generator so as to communicate fluid with each other.

6. The fuel cell according to claim 5, wherein the mixed fuel supplying pipe is connected with a fuel pump, and the fourth valve is placed in the front of the fuel pump.

7. The fuel cell according to claim 5, wherein the mixed fuel supplying pipe is connected with a fuel pump, and the fourth valve is placed in the back of the fuel pump.

8. The fuel cell of claim 1, wherein the anode recovering pipe is configured to directly communicate the fluid between the anode electrode outlet and the second valve and between the second valve and the housing.

9. The fuel cell of claim 1, further comprising a fuel supplying pipe configured to directly provide the raw fuel from the fuel container to the housing.

10. The fuel cell of claim 9, wherein the fuel supplying pipe includes neither a pump nor a valve.

* * * * *